US012763934B2

(12) United States Patent
Choi et al.

(10) Patent No.: US 12,763,934 B2
(45) Date of Patent: Oct. 13, 2026

(54) METHOD AND DEVICE FOR EXCHANGING KEY

(71) Applicant: SAMSUNG SDS CO., LTD., Seoul (KR)

(72) Inventors: Kyu Young Choi, Seoul (KR); Eun Kyung Kim, Seoul (KR); Hyo Jin Yoon, Seoul (KR); Ji Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 19/225,479

(22) Filed: Jun. 2, 2025

(65) Prior Publication Data

US 2026/0031980 A1 Jan. 29, 2026

(30) Foreign Application Priority Data

Jul. 25, 2024 (KR) ........................ 10-2024-0098876
Apr. 18, 2025 (KR) ........................ 10-2025-0050581

(51) Int. Cl.
*H04L 9/08* (2006.01)

(52) U.S. Cl.
CPC .......... *H04L 9/0825* (2013.01); *H04L 9/0827* (2013.01); *H04L 9/0866* (2013.01)

(58) Field of Classification Search
CPC ............................ H04L 9/0825; H04L 9/0866
See application file for complete search history.

(56) References Cited

U.S. PATENT DOCUMENTS 11,431,498 B2 * 8/2022 Goncalves ............ H04L 9/0825
12,021,852 B2 * 6/2024 Katsumata ............ H04L 9/0844

(Continued)

FOREIGN PATENT DOCUMENTS

KR 10-1802826 B1 11/2017
KR 10-2024-0031845 A 3/2024
KR 10-2024-0139222 A 9/2024

OTHER PUBLICATIONS

Banerjee, Utsav et al., "Efficient Post-Quantum TLS Handshakes using Identity-Based Key Exchange from Lattices", 2020 IEEE International Conference on Communications, Jun. 2020. (8 pages total).

(Continued)

*Primary Examiner* — Hieu T Hoang
(74) *Attorney, Agent, or Firm* — Sughrue Mion, PLLC

(57) ABSTRACT

According to an aspect of the present disclosure, there is provided a method for exchanging a key. The method being performed by a first communication device related to a first user, the method may comprise acquiring a first public key using an identifier of a second user, encrypting first data using the first public key, transmitting a second public key and the encrypted first data to a second communication device related to the second user, receiving encrypted second data and encrypted third data from the second communication device, decrypting the encrypted second data using a first secret key generated based on an identifier of the first user, decrypting the third data using a second secret key related to the second public key and generating a session key for communication with the second communication device, using the decrypted first data, second and third data.

20 Claims, 8 Drawing Sheets

(56) References Cited

U.S. PATENT DOCUMENTS

| | | | | |
|---|---|---|---|---|
| 2021/0226782 | A1* | 7/2021 | Florit | H04L 9/0844 |
| 2022/0006835 | A1 | 1/2022 | Gray et al. | |
| 2022/0038269 | A1 | 2/2022 | Nix | |
| 2022/0294611 | A1* | 9/2022 | Katsumata | H04L 9/0844 |
| 2023/0308424 | A1* | 9/2023 | Nix | H04L 9/3242 |
| 2024/0340164 | A1* | 10/2024 | Lehtovirta | H04L 9/0643 |
| 2025/0038969 | A1 | 1/2025 | Banerjee et al. | |

OTHER PUBLICATIONS

Fujioka, Atsushi et al., "Strongly Secure Authenticated Key Exchange from Factoring, Codes, and Lattices*", PKC 2012 [FSXY12]. (33 pages total).

* cited by examiner

FIG. 2

| index | Secret key parameter | Use flag |
|---|---|---|
| 1 | sk_1 | 0 |
| 2 | sk_2 | 0 |
| 3 | sk_3 | 0 |
| ⋮ | ⋮ | ⋮ |
| 255 | sk_255 | 0 |
| 256 | sk_256 | 0 |

210

| index | Public key parameter | Use flag |
|---|---|---|
| 1 | pk_1 | 0 |
| 2 | pk_2 | 0 |
| 3 | pk_3 | 0 |
| ⋮ | ⋮ | ⋮ |
| 255 | pk_255 | 0 |
| 256 | pk_256 | 0 |

220

METHOD AND DEVICE FOR EXCHANGING KEY

CROSS-REFERENCE TO RELATED APPLICATIONS

This application claims priority from Korean Patent Application No. 10-2024-0098876 filed on Jul. 25, 2024 and Korean Patent Application No. 10-2025-0050581 filed on Apr. 18, 2025 in the Korean Intellectual Property Office, and all the benefits accruing therefrom under 35 U.S.C. 119, the contents of which in its entirety are herein incorporated by reference.

BACKGROUND

Field

The present disclosure is directed to a key exchange method. More specifically, the present disclosure relates to a method for exchanging a session key used when performing communication between communication devices with each other.

Description of Related Art

Standardization studies on PQC (Post-Quantum Cryptography) are being actively conducted. The PQC (Post-Quantum Cryptography) technology is a type of public key-based encryption technology and requires a certificate for a public key.

However, since a length of each of a ciphertext and a key is relatively large in the PQC-related algorithm, performance degradation of the PQC-related algorithm may occur. Accordingly, the complexity of the PQC-related algorithm further increases when a certificate is used in the PQC-related technology.

Accordingly, the PQC-related technology that does not require the certificate is required.

SUMMARY

A technical purpose to be achieved in some embodiments of the present disclosure is to provide a method and device capable of exchanging a key without using a certificate.

Another technical purpose to be achieved in some embodiments of the present disclosure is to provide a method and device capable of generating a key for PQC (Post-Quantum Cryptography).

Still another technical purpose to be achieved in some embodiments of the present disclosure is to provide a key exchange method and device for improving encryption performance and security.

The technical purposes of the present disclosure are not limited to the above-mentioned technical purposes, and other technical purposes not mentioned may be clearly understood by a person skilled in the art of the present disclosure from the following description.

According to an aspect of the present disclosure, there is provided a method for exchanging a key, the method being performed by a first communication device related to a first user, the method may comprise acquiring a first public key using an identifier of a second user, encrypting first data using the first public key, transmitting a second public key and the encrypted first data to a second communication device related to the second user, receiving encrypted second data and encrypted third data from the second communication device, decrypting the encrypted second data using a first secret key generated based on an identifier of the first user, decrypting the third data using a second secret key related to the second public key and generating a session key for communication with the second communication device, using the decrypted first data, second and third data.

In some embodiments, the method may further comprise after generating the session key, encrypting data to be transmitted to the second communication device using the generated session key and transmitting the encrypted data to the second communication device.

In some embodiments, the method may further comprise before transmitting the second public key and the encrypted first data to the second communication device related to the second user, generating the second public key and a second private key using a key generation algorithm.

In some embodiments, the encrypted second data may be data encrypted using a third public key generated based on the identifier of the first user, wherein the encrypted third data may be data encrypted using the second public key.

In some embodiments, the acquiring of the first public key using the identifier of the second user may include generating a plurality of bit strings based on the identifier of the second user, acquiring a plurality of public key parameters related to the generated plurality of bit strings and acquiring the first public key based on the acquired plurality of public key parameters.

In some embodiments, the acquiring of the plurality of public key parameters may include extracting a public key parameter corresponding to each of the plurality of bit strings from a table in which a public key parameter related to each index is recorded.

In some embodiments, the table in which the public key parameter related to each index is recorded may be received from an external device.

In some embodiments, the acquiring of the first public key may include applying the plurality of public key parameters to a predetermined mathematical formula or algorithm to calculate an operation result value on the plurality of public key parameters and determining the calculated operation result value as the first public key.

According to the aforementioned and other embodiments of the present disclosure, there is provided a method for acquiring a key, the method being performed by a second communication device related to a second user, the method may comprise receiving a second public key and encrypted first data from a first communication device related to a first user, decrypting the encrypted first data using a first secret key generated based on an identifier of the second user, acquiring a first public key based on an identifier of the first user, encrypting second data using the first public key, encrypting third data using the second public key, transmitting the encrypted second data and the encrypted third data to the first communication device such that the first communication device generates a session key and generating the session key using the decrypted first data, the decrypted second data, and the decrypted third data.

In some embodiments, the encrypted first data may be data encrypted using a third public key generated based on the identifier of the second user.

In some embodiments, the acquiring of the first public key based on the identifier of the first user may include generating a plurality of bit strings based on the identifier of the first user, acquiring a plurality of public key parameters related to the generated plurality of bit strings and acquiring the first public key, based on the acquired plurality of public key parameters, In some embodiments, the acquiring of the plurality of public key parameters may include extracting a public key parameter corresponding to each of the plurality of bit strings from a table in which a public key parameter related to each index is recorded.

In some embodiments, the acquiring of the first public key may include applying the plurality of public key parameters to a predetermined mathematical formula or algorithm to calculate an operation result value on the plurality of public key parameters and determining the calculated operation result value as the first public key.

According to the aforementioned and other embodiments of the present disclosure, there is provided a computing device comprise one or more processors and a memory for storing therein a computer program executed by the one or more processors, wherein the computer program may include instructions for acquiring a first public key using an identifier of a second user, encrypting first data using the first public key, transmitting a second public key and the encrypted first data to a communication device related to the second user, receiving encrypted second data and encrypted third data from the communication device, decrypting the encrypted second data using a first secret key generated based on an identifier of a first user, decrypting the third data using a second secret key related to the second public key and generating a session key for communication with the communication device, using the decrypted first data, the decrypted second data, and the decrypted third data.

Specific details of other embodiments are included in the detailed description and drawings.

BRIEF DESCRIPTION OF DRAWINGS

The above and other aspects and features of the present disclosure will become more apparent by describing in detail embodiments thereof with reference to the attached drawings, in which:

FIG. 2 is a diagram illustrating a first table and a second table according to an embodiment of the disclosure;

DETAILED DESCRIPTIONS

Figure 1:
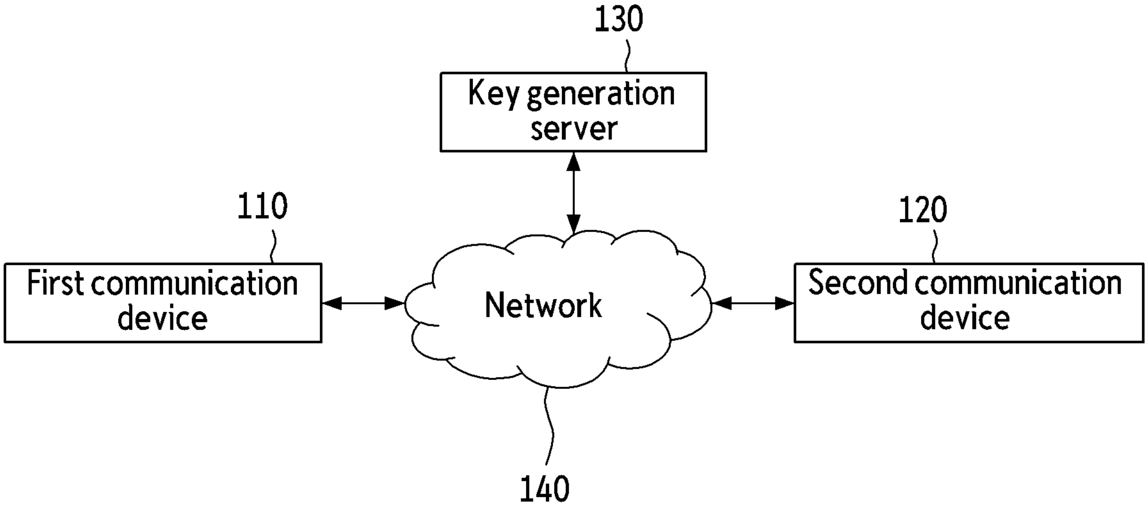
FIG. 1 is a diagram illustrating a system for key exchange according to an embodiment of the disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Embodiments of the present disclosure will hereinafter be described with reference to the accompanying drawings.

FIG. 1 is a diagram illustrating a system for key exchange according to an embodiment of the present disclosure.

As illustrated in FIG. 1, the system for key exchange may include a first communication device 110, a second communication device 120, and a key generation server 130. The first communication device 110, the second communication device 120, and the key generation server 130 may communicate with each other through a network 140. The network 140 may include a mobile communication network, a wired communication network, and the like.

The key generation server 130 may generate a secret key and a public key. In this regard, the secret key may be referred to as a private key. According to an embodiment, the key generation server 130 may generate a secret key based on an identifier (ID) of a user. The key generation server 130 may store therein a first table (refer to 210 in FIG. 2) which is used to generate a secret key and in which a plurality of secret key parameters are recorded. In addition, the key generation server 130 may store therein a second table (refer to 220 of FIG. 2) which is used to generate a public key and in which a plurality of public key parameters are recorded.

FIG. 2 is a diagram illustrating a first table and a second table according to an embodiment of the disclosure.

Referring to FIG. 2, the first table 210 may include an index, a secret key parameter, and a use flag. The index of the first table 210 may be a value related to a bit having a predetermined size. In FIG. 2, it is illustrated that the index is a number from 1 to 256 corresponding to a value of 8 bits.

The secret key parameter of the first table 210 may be data for generating a secret key. Each secret key parameter may be generated using a secret key generation algorithm. For example, a random number or the like may be input to the secret key generation algorithm, and the secret key parameter may be generated therefrom. The secret key parameter may be a bit string having a predetermined length, a number string having a predetermined length, or a combination of numbers and letters having a predetermined length.

The use flag of the first table 210 may be information on whether the secret key parameter is used. When the use flag is '1', the secret key parameter may be interpreted as being already used. When the use flag is '0', the related secret key parameter may be interpreted as not being used yet. All of the use flags may be set to '0' in a default manner.

The second table 220 may include an index, a public key parameter, and a use flag. It is illustrated that the index of the second table 220 is a number from 1 to 256. The length of the index of the second table 220 may be equal to the length of the index of the first table 210.

The public key parameter of the second table 220 may be data for generating a public key. Each public key parameter may be generated using a public key generation algorithm. For example, a specific public key parameter may be generated based on a specific private key parameter. That is, based on the secret key parameter of a specific index, the public key parameter of the specific index may be generated. Accordingly, the secret key parameter of the specific index and the public key parameter of the specific index may be related to each other in a pair manner. The public key parameter may be a bit string having a predetermined length, a number string having a predetermined length, or a combination of numbers and letters having a predetermined length.

The use flag of the second table 220 may be information on whether a specific public key parameter is used. When the use flag is '1', the public key parameter may be interpreted as being already used. When the use flag is '0', the related public key parameter may be interpreted as not yet used. All the use flags may be set to '0' in a default manner.

Referring back to FIG. 1, when the identifier ID of the user has been acquired, the key generation server 130 may generate a plurality of bit strings based on the identifier of the user and identify a plurality of indexes corresponding to the plurality of bit strings. In this regard, the identifier of the user is the only information given to the user, and may be, for example, a mobile communication phone number, an email address, etc. The key generation server 130 may generate a plurality of secret key parameters related to a plurality of indexes, and generate a user's secret key using the plurality of secret key parameters. The key generation server 130 may transmit the generated user's secret key to the user's communication device through a security channel.

According to an embodiment, the key generation server 130 may transmit the second table 220 used to generate the public key to the first communication device 110 and the second communication device 120 to share the second table 220.

Each of the first communication device 110 and the second communication device 120 is a device capable of communicating with the network 140, and may include a smartphone, a desktop computer, a tablet computer, a laptop, an Internet Protocol Television (IPTV), and the like. However, the present disclosure is not limited thereto, and each of the communication devices 110 and 120 may be embodied as any device capable of communicating with the network 140.

The first communication device 110 and the second communication device 120 may exchange a session key with each other. For the session key exchange, each of the first communication device 110 and the second communication device 120 may acquire the public key related to the identifier of a counterpart user using the shared second table 220. In addition, each of the first communication device 110 and the second communication device 120 may transmit data encrypted using the acquired public key to the counterpart communication device.

According to an embodiment, each of the first communication device 110 and the second communication device 120 may generate the session key based on first data, second data, and third data, encrypt and transmit data using the generated session key, or decrypt the encrypted data using the generated session key. A method for performing key exchange between a transmitting node and a receiving node will be described in detail with reference to FIG. 5.

According to the present embodiment, a certificate is not required, and accordingly, a computing resource in performing an operation for key exchange may be reduced.

A method for generating a secret key or a public key will be described with reference to FIGS. 3 and 4.

Each of the methods according to an embodiment to be described later is only an embodiment for achieving the purpose of the present disclosure, and it is obvious that some steps may be added or omitted as necessary. In addition, the method illustrated in FIGS. 3 and 4 may be performed by at least one processor included in the computing device or the computing system.

Figure 3:
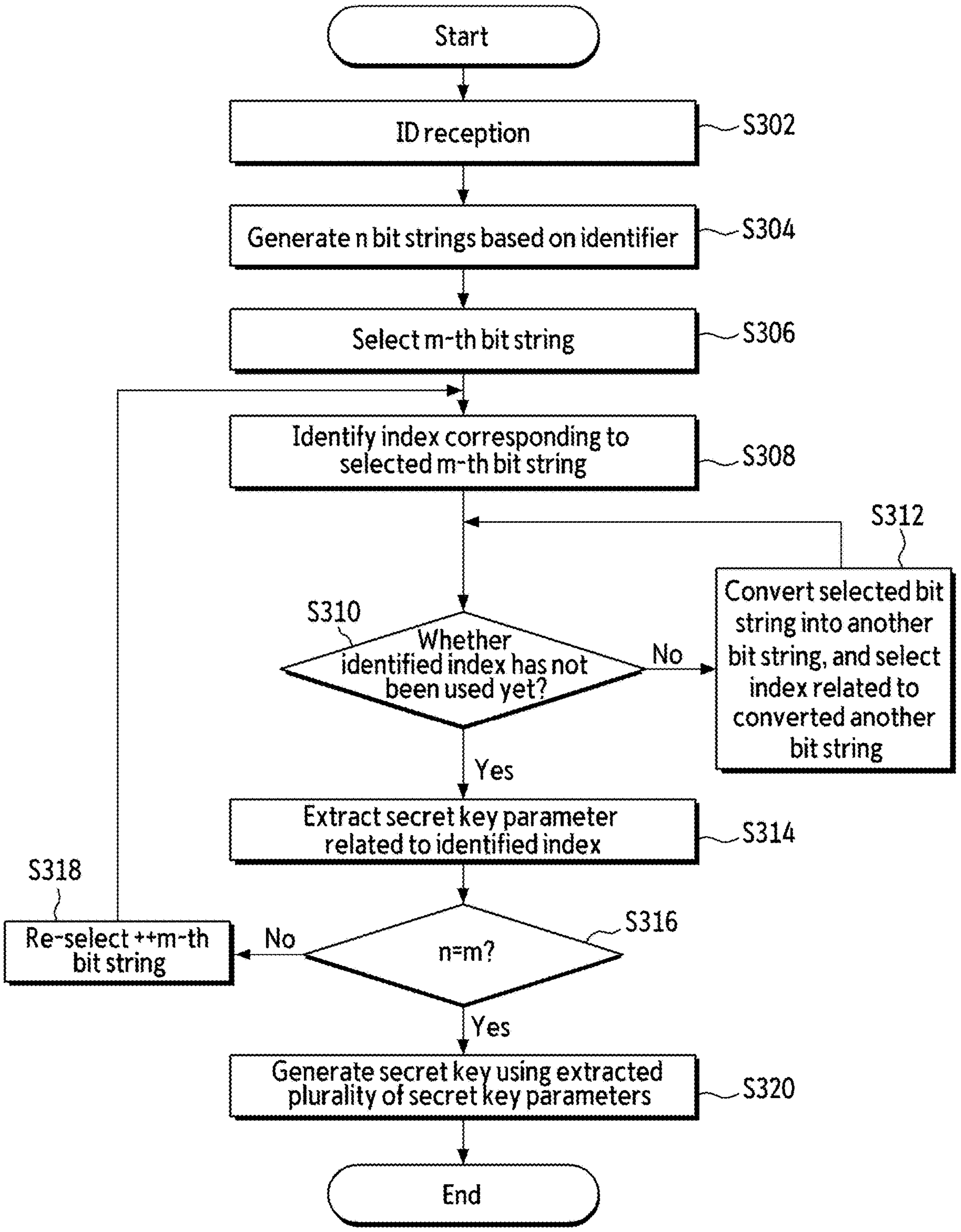
FIG. 3 is a flowchart illustrating a method for generating a secret key according to an embodiment of the disclosure.

FIG. 3 is a flowchart illustrating a method for generating a secret key according to an embodiment of the disclosure. For convenience of description, it is assumed that the method disclosed in FIG. 3 is performed in a server such as the key generation server of FIG. 1.

The server may receive the identifier (ID) of the user in S302. For example, the server may receive the user's identifier from a communication device that desires to generate a secret key.

Then, the server may generate n bit strings (where n is a natural number of 2 or greater) based on the identifier in S304. In this case, the server may generate a bit string having a predetermined length by applying the user's identifier to a hash function, and generate the n bit strings by dividing the generated bit string into the n bit strings. Subsequently, the server may convert each of the n bit strings into a bit string having the same size as that of the index. For example, the server may convert each of the n bit strings into a bit string having the same size as that of the index using a permutation function.

Thereafter, the server may select a m-th bit string (where m is a natural number) among the n bit strings in S306. According to an embodiment, 'm' is set to '1' in a default manner and accordingly, the server may select a first bit string in a default manner.

Subsequently, the server may identify an index corresponding to the selected m-th bit string from the first table in S308. For example, the server may identify an index matching the m-th bit string from the first table. The first table may be a table used for generating a secret key.

The server may determine whether the identified index has been already used in S310. The server may determine whether the identified index has been used with referring to the use flag of the first table. In this regard, it may be understood that when the index has been already used, the secret key parameter related to the index has been already used.

When it is determined that the identified index has been already used, the server may convert the selected bit string into another bit string, and select an index related to the converted another bit string again in S312. According to some embodiments, the server may convert the selected bit string into another bit string using a permutation function. Thereafter, the server may again determine whether the re-selected index has already been used.

On the other hand, when it is determined that the identified index has not been used yet, the server may extract a secret key parameter related to the identified index in S314. When the secret key parameter has been extracted, the server may change the use flag related to the identified index to a value indicating that the index has been used (e.g., change from 0 to 1).

Thereafter, the server may determine whether m and n are equal to each other in S316. That is, the server may determine whether all n bit strings have been selected. If m and n are not equal to each other, the server may increase m by 'l' and re-select an increased m-th bit string (i.e., ++m-th bit string) in S318. Thereafter, the server may proceed with the step S308 of identifying an index corresponding to the selected bit string again. According to this process, a plurality of secret key parameters related to each bit string may be extracted.

When it is determined in the step S316 that m and n are equal to each other, the server may generate the secret key using the extracted plurality of secret key parameters in S320. According to an embodiment, the server may calculate an operation result value on the plurality of secret key parameters by applying the plurality of secret key parameters to a predetermined mathematical formula, and may determine the calculated operation result value as the secret key. In this regard, the mathematical formula may be related to the four basic arithmetic operations or related to the bit-based logical computation. According to some embodiments, the server may generate a secret key by combining a plurality of secret key parameters with each other. In this case, each of the plurality of secret key parameters may have a size smaller than a length of the secret key, and the secret key may be generated by combining the plurality of secret key parameters with each other in a predetermined order.

The secret key generated by the server in this way may be transmitted to the user's communication device using a secure channel and stored in the user's communication device.

Figure 4:
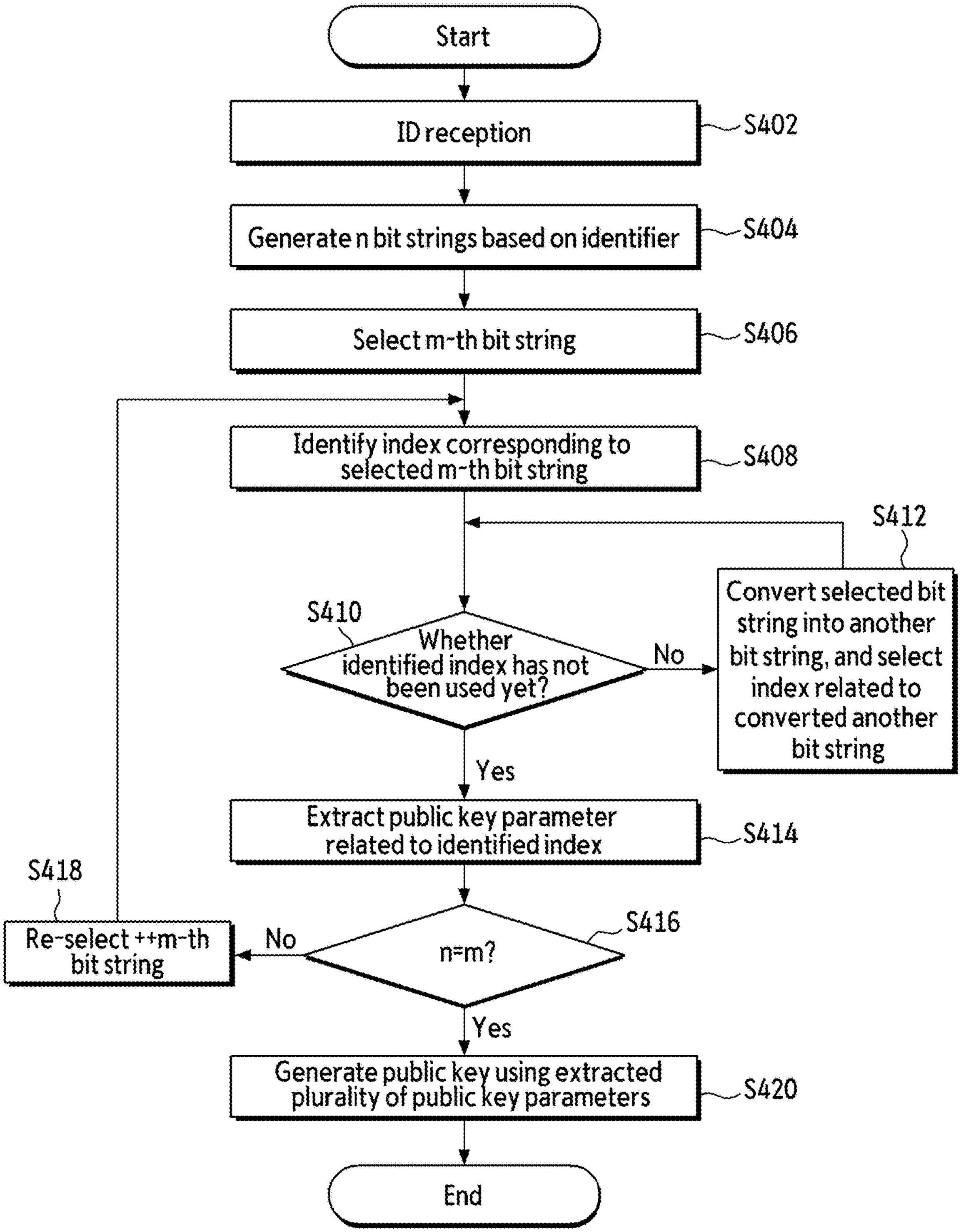
FIG. 4 is a flowchart illustrating a method for generating a public key according to an embodiment of the disclosure.

FIG. 4 is a flowchart illustrating a method for generating a public key according to an embodiment of the disclosure. For convenience of description, it is assumed that the method disclosed in FIG. 4 is performed in the communication device or the like illustrated in FIG. 1.

The communication device may receive the identifier ID of the user in S402. In this regard, the user's identifier may be an identifier assigned to the communication counterpart.

Then, the communication device may generate n bit strings (where n is a natural number of two or greater) based on the user's identifier in S404. In this case, the communication device may generate a bit string having a predetermined length by applying the user's identifier to the hash function, and generate n bit strings by dividing the generated bit string into n bit strings, and then the communication device may convert each of the n bit strings into a bit string having the same size as that of the index. For example, the communication device may convert each of the n bit strings into a bit string having the same size as that of the index using a permutation function.

Thereafter, the communication device may select an m-th (where m is a natural number) bit string from among the n bit strings in S406. According to an embodiment, 'm' is set to '1' in a default manner, and accordingly, the communication device may select the first bit string in a default manner.

Subsequently, the communication device may identify an index corresponding to the selected m-th bit string from the second table in S408. For example, the communication device may identify an index matching the m-th bit string from the second table. The second table may be a table used for generating a public key.

The communication device may determine whether the identified index has already been used in S410. The communication device may determine whether the identified index has been used with reference to the use flag of the second table. In this regard, the fact that the index has been already used may refer to that the public key parameter related to the index has been already used.

When it is determined that the identified index has already been used, the communication device may convert the selected bit string into another bit string and re-select an index related to the converted another bit string in S412. According to some embodiments, the communication device may convert the selected bit string into another bit string using a permutation function. Thereafter, the communication device may re-determine whether the re-selected index has already been used.

On the other hand, when it is determined that the identified index has not been used yet, the communication device may extract a public key parameter related to the identified index in S414. When the public key parameter has been extracted, the communication device may change the use flag related to the identified index to a value indicating that the index has been used (e.g., change from 0 to 1).

Thereafter, the communication device may determine whether m and n are equal to each other in S416. That is, the communication device may determine whether all n bit strings are selected. When the m and the n are not the same, the communication device may increase the m by '1' and may re-select an increased m-th bit string (i.e., the ++m-th bit string) in S418. Thereafter, the communication device may proceed again with the step S408 of identifying an index corresponding to the selected bit string again. According to this process, a plurality of public key parameters related to each bit string may be extracted.

Meanwhile, if it is determined that m and n are equal to each other in the step S416, the communication device may generate a public key using the extracted plurality of public key parameters in S420. In this regard, the generated public key may be a public key of the communication counterpart. According to an embodiment, the communication device may calculate an operation result value on the plurality of public key parameters by applying the plurality of public key parameters to a predetermined mathematical formula, and determine the calculated operation result value as the public key. In this regard, the mathematical formula may be related to the four basic arithmetic operations or may be related to the bit-based logical computation. According to some embodiments, the communication device may generate a public key by combining a plurality of public key parameters with each other. In this case, each of the plurality of public key parameters is smaller than the length of the public key, and the plurality of public key parameters may be combined with each other in a predetermined order to generate the public key.

According to some embodiments, the hash function, the number n of bit strings into the generated bit string divides, the permutation function, the public key, or the mathematical formula or algorithm applied to generate the public key or the secret key in FIG. 3 may be respectively identical with the hash function, the number n of bit strings into the generated bit string divides, the permutation function, the public key, or the mathematical formula or algorithm applied to generate the public key or the secret key in FIG. 4. Accordingly, when the secret key and the public key are generated based on one user ID, the data encrypted with the public key may be normally decrypted with the secret key. In addition, the public key may be generated based on the second table and the user ID, without separately receiving the public key.

Figure 5:
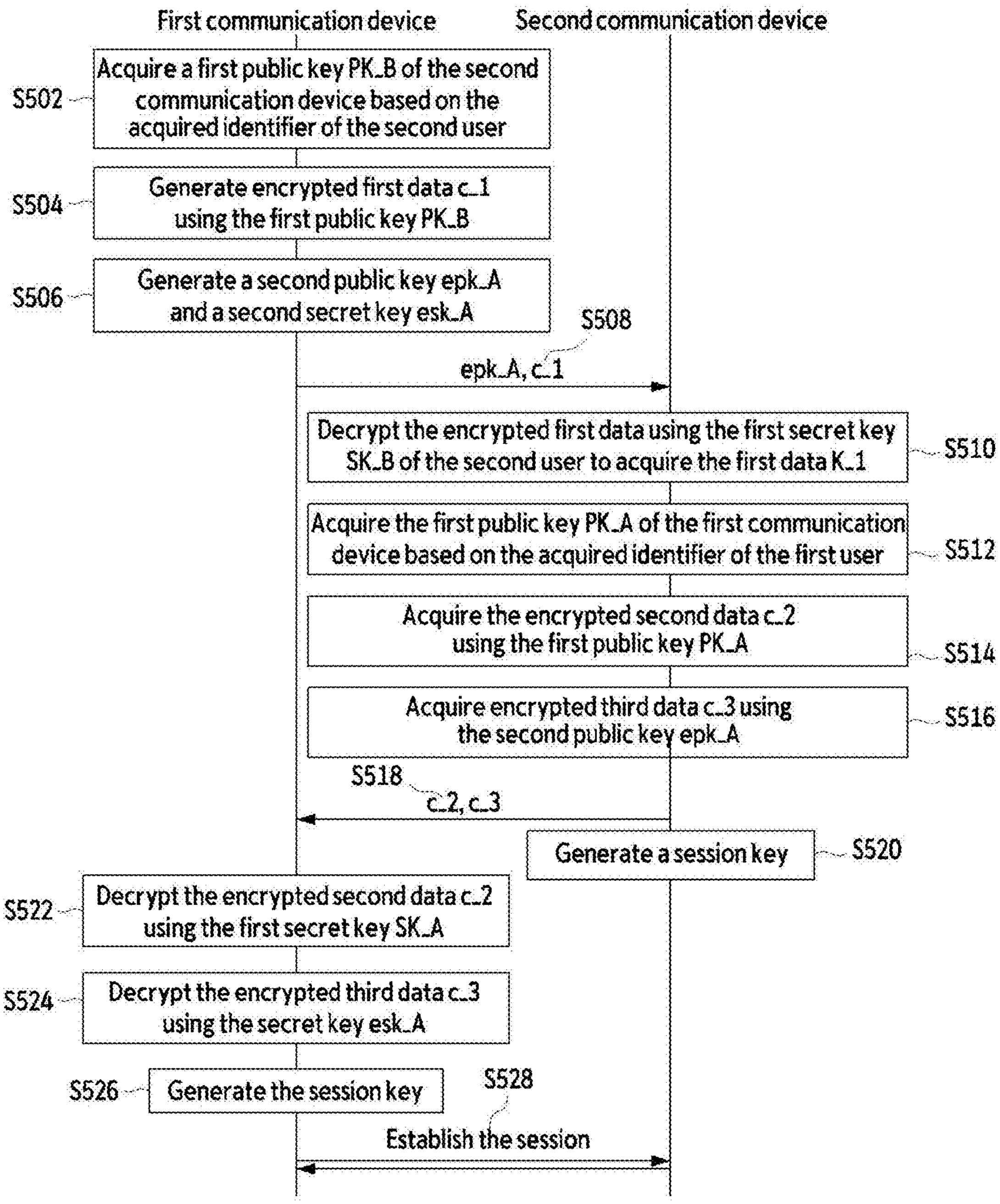
FIG. 5 is a signal flowchart illustrating a method for exchanging a key between a plurality of communication devices according to an embodiment of the present disclosure.

FIG. 5 is a signal flowchart illustrating a method for exchanging a key between a plurality of communication devices according to an embodiment of the present disclosure.

In FIG. 5, the first communication device may be related to a first user, and the second communication device may be related to a second user. In an embodiment to be described later, the public key/secret key of the communication device may be understood to be a public key/secret key attributed to a user using the corresponding communication device.

Referring to FIG. 5, the first communication device may acquire the identifier (ID) of the second user, and may acquire a first public key PK_B of the second communication device based on the acquired identifier of the second user in S502. According to some embodiments, the first communication device may acquire the first public key PK_B of the second communication device based on the method described in FIG. 4.

Thereafter, the first communication device may generate encrypted first data c_1 using the first public key PK_B in S504. Further, the first communication device may generate decrypted first data K_1. In some embodiments, the first communication device may acquire the encrypted first data c_1 and the decrypted first data K_1 using 'ID-KEM_Encap( )' as an ID-based encryption-related function. "ID-KEM_Encap( )" being used to acquire the encrypted first data c_1 and the decrypted first data K_1 may be expressed as follows:

$$ID\text{-}KEM\_\mathrm{Encap}(PK\_B) \rightarrow (K\_1, c\_1)$$

Thereafter, the first communication device may generate a second public key epk_A and a second secret key esk_A of the first communication device using a key generation algorithm in S506. For example, the first communication device may generate the second public key epk_A and the second secret key esk_A using an asymmetric key generation algorithm in S506.

Subsequently, the first communication device may transmit the second public key epk_A and the encrypted first data c_1 to the second communication device in S508. In this regard, the second communication device may be a device with which the first communication device establishes a communication session.

The second communication device may decrypt the encrypted first data using the first secret key SK_B of the second user to acquire the first data K_1 in S510. The second communication device may receive the first secret key SK_B of the second user from the key generation server and pre-store the same therein. In some embodiments, the second communication device may acquire the decrypted first data K_1 using 'ID-KEM_Decap( )' as an ID-based decryption-related function. The decrypted first data K_1 being acquired using 'ID-KEM_Decap( )' may be expressed as follows:

$$ID\text{-}KEM\_\mathrm{Decap}(c\_1, SK\_B) \rightarrow K\_1$$

Thereafter, the second communication device may acquire the identifier of the first user, and may acquire the first public key PK_A of the first communication device based on the acquired identifier of the first user in S512. According to an embodiment, the second communication device may acquire the first public key PK_A of the first communication device, based on the method described in FIG. 4.

Subsequently, the second communication device may acquire the encrypted second data c_2 using the first public key PK_A of the first communication device in S514. In some embodiments, the second communication device may acquire the encrypted second data c_2 and the decrypted second data K_2 using 'ID-KEM_Encap( )' as an ID-based encryption-related function. "ID-KEM_Encap( )" being used to acquire the encrypted second data (c_2) and the decrypted second data (K_2) may be expressed as follows:

$$ID\text{-}KEM\_\mathrm{Encap}(PK\_A) \rightarrow (K\_2, c\_2)$$

Thereafter, the second communication device may acquire encrypted third data c_3 using the second public key epk_A of the first communication device received from the first communication device in S516. In some embodiments, the second communication device may acquire the encrypted second data c_3 and the decrypted second data K_3 using the encryption-related function 'KEM_Encap( )'. "KEM_Encap( )" being used to acquire the encrypted third data c_3 and the decrypted third data K_3 may be expressed as follows:

$$KEM\_\mathrm{Encap}(epk\_A) \rightarrow (K\_3, c\_3)$$

Thereafter, the second communication device may transmit the encrypted second data c_2 and the encrypted third data c_3 to the first communication device in S518. In addition, the second communication device may generate a session key using the decrypted first data K_1, the decrypted second data K_2, and the decrypted third data K_3 in S520. According to some embodiments, the second communication device may determine, as the session key, a result value calculated by applying the decrypted first data K_1, second data K_2, and third data K_3 to a predetermined mathematical algorithm or mathematical formula.

The first communication device may decrypt the encrypted second data c_2 using the first secret key SK_A of the first user to acquire the second data K_2 in S522. The first communication device may receive the first secret key SK_A of the first user from the key generation server and pre-store the same therein. In some embodiments, the first communication device may acquire the decrypted second data K_2 using 'ID-KEM_Decap( )' as an ID-based decryption-related function. The decrypted second data K_2 being acquired using "ID-KEM_Decap( )" may be expressed as follows:

$$ID\text{-}KEM\_\mathrm{Decap}(c\_2, SK\_A) \rightarrow K\_2$$

The first communication device may decrypt the encrypted third data c_3 using the secret key esk_A of the first communication device generated in step S506 to acquire the third data K 3 in S524. In some embodiments, the first communication device may acquire the decrypted third data K_3 using 'KEM_Decap( )' as a decryption-related function. The decrypted third data K_3 being acquired using 'KEM_Decap( )' may be expressed as follows:

$$KEM\_\mathrm{Decap}(c\_3, esk\_A) \rightarrow K\_3$$

Thereafter, the first communication device may generate the session key using the decrypted first data K_1, second data K_2, and third data K_3 in S526. According to some embodiments, the first communication device may determine, as the session key, a result value calculated by applying the decrypted first data K_1, second data K_2, and third data K_3 to a predetermined mathematical algorithm or mathematical formula. The session between the first and second communication devices may be established based on the session key in S538.

According to an embodiment of the present disclosure, the key exchange may be performed without using a certificate. In addition, as the certificate is not used, a computing resource input for the certificate processing may be reduced, thereby improving overall performance. In addition, since the identifier-based public keys PK_A and PK_B cannot be forged or tampered with, the session key may be used in the PQC (Post-Quantum Cryptography), and overall security may be improved.

Figure 6:
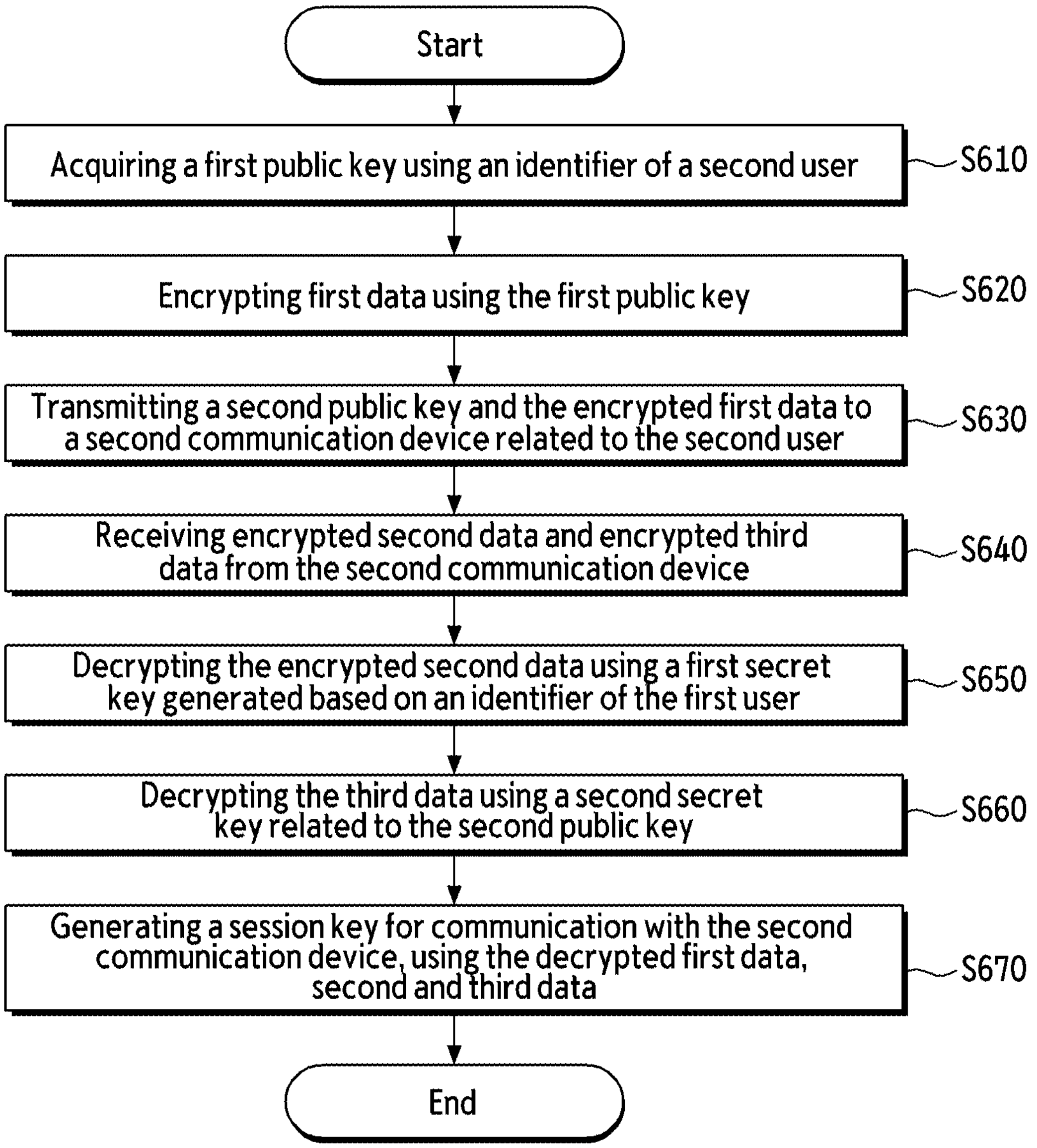
FIG. 6 is a flowchart illustrating a method for generating a session key in a first communication device according to an embodiment of the disclosure

FIG. 6 is a flowchart illustrating a method for generating a session key in a first communication device according to an embodiment of the disclosure.

In this embodiment, the first communication device may be a device related to the first user.

Referring to FIG. 6, the first communication device may acquire the first public key using the identifier of the second user in S610. The second user may be a communication counterpart, and the first public key may be a public key generated based on an identifier of the second user.

According to some embodiments, the first communication device may generate a plurality of bit strings based on the identifier of the second user, and may acquire a plurality of public key parameters related to the generated plurality of bit strings. The first communication device may extract a public key parameter corresponding to each of a plurality of bit strings from a table in which a public key parameter related to each index is recorded. According to some embodiments, the table in which the public key parameter related to each index is recorded may be received from an external device. In this regard, the external device may be a cloud computing system, a key management server, etc.

The first communication device may acquire a first public key based on the acquired plurality of public key parameters. According to some embodiments, the first communication device may calculate an operation result value on the plurality of public key parameters by applying the plurality of public key parameters to a predetermined mathematical formula or algorithm, and then determine the calculated operation result value as the first public key.

Thereafter, the first communication device may encrypt the first data using the first public key in S620.

Next, the first communication device may transmit the second public key and the encrypted first data to the second communication device related to the second user in S630. According to some embodiments, the first communication device may generate the second public key and the second private key using a key generation algorithm.

Thereafter, the first communication device may receive the encrypted second data and the encrypted third data from the second communication device in S640. The encrypted second data may be data encrypted using a third public key generated based on the identifier of the first user, and the encrypted third data may be data encrypted using the second public key. The encryption of the second data and the encryption of the third data may be performed by the second communication device. The third public key may be paired with the first private key, and the third public key and the first private key may be generated based on the identifier of the first user.

Subsequently, the first communication device may decrypt the encrypted second data using the first secret key generated based on the identifier of the first user in S650.

Thereafter, the first communication device may decrypt the third data using the second secret key related to the second public key in S660.

Next, the first communication device may generate a session key for communication with the second communication device using the decrypted first data, second data, and third data in S670.

Thereafter, the first communication device may establish a communication session with the second communication device, encrypt data to be transmitted to the second communication device using the generated session key, and transmit the encrypted data to the second communication device with which the session has been established. In addition, upon receiving the encrypted data from the second communication device with which the session has been established, the first communication device may decrypt the encrypted data using the session key.

Figure 7:
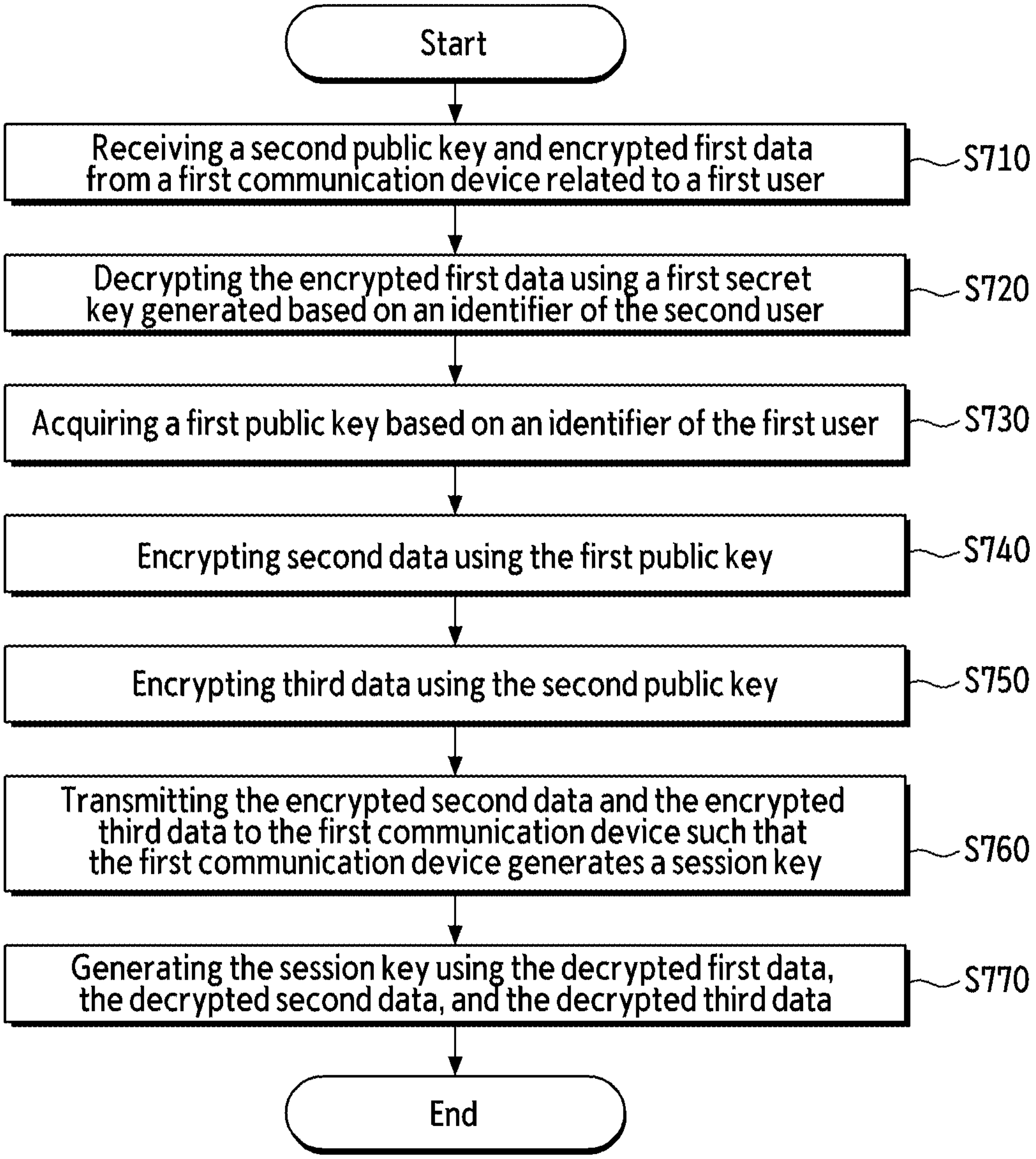
FIG. 7 is a flowchart illustrating a method for generating a session key in a second communication device, according to an embodiment.

FIG. 7 is a flowchart illustrating a method for generating a session key in a second communication device according to an embodiment.

In the present embodiment, the second communication device may be a device related to the second user.

The second communication device may receive the second public key and the encrypted first data from the first communication device related to the first user in S710. The encrypted first data may be data encrypted using the third public key generated based on the identifier of the second user.

Thereafter, the second communication device may decrypt the encrypted first data using the first secret key generated based on the identifier of the second user in S720. The first secret key and the third public key are related to each other in a pair manner, and the first secret key and the third public key may be generated based on the identifier of the second user. Moreover, the encryption on the first data may be performed in the first communication device.

Next, the second communication device may acquire the first public key based on the identifier of the first user in S730. The second communication device may generate a plurality of bit strings based on the identifier of the first user, and acquire a plurality of public key parameters related to the generated plurality of bit strings. According to some embodiments, the second communication device may extract a public key parameter corresponding to each of the plurality of bit strings from a table in which the public key parameter related to each index is recorded. Thereafter, the second communication device may acquire the first public key based on the acquired plurality of public key parameters. In some embodiments, the second communication device may calculate an operation result value on the plurality of public key parameters by applying the plurality of public key parameters to a predetermined mathematical formula or algorithm, and determine the calculated operation result value as the first public key.

Thereafter, the second communication device may encrypt the second data using the first public key in S740.

Subsequently, the second communication device may encrypt the third data using the second public key in S750.

Thereafter, the second communication device may transmit the encrypted second data and the encrypted third data to the first communication device such that the session key is to be generated in the first communication device in S760.

Next, the second communication device may generate the session key using the decrypted first data, second data, and third data in S770.

Thereafter, the second communication device may establish a session with the first communication device, encrypt data to be transmitted to the first communication device using the generated session key, and transmit the encrypted data to the first communication device with which the session has been established. In addition, the second communication device may decrypt the encrypted data using the session key when receiving the encrypted data from the first communication device with which the session has been established.

Hereinafter, a hardware configuration of an exemplary computing device according to some embodiments will be described with reference to FIG. 8.

Figure 8:
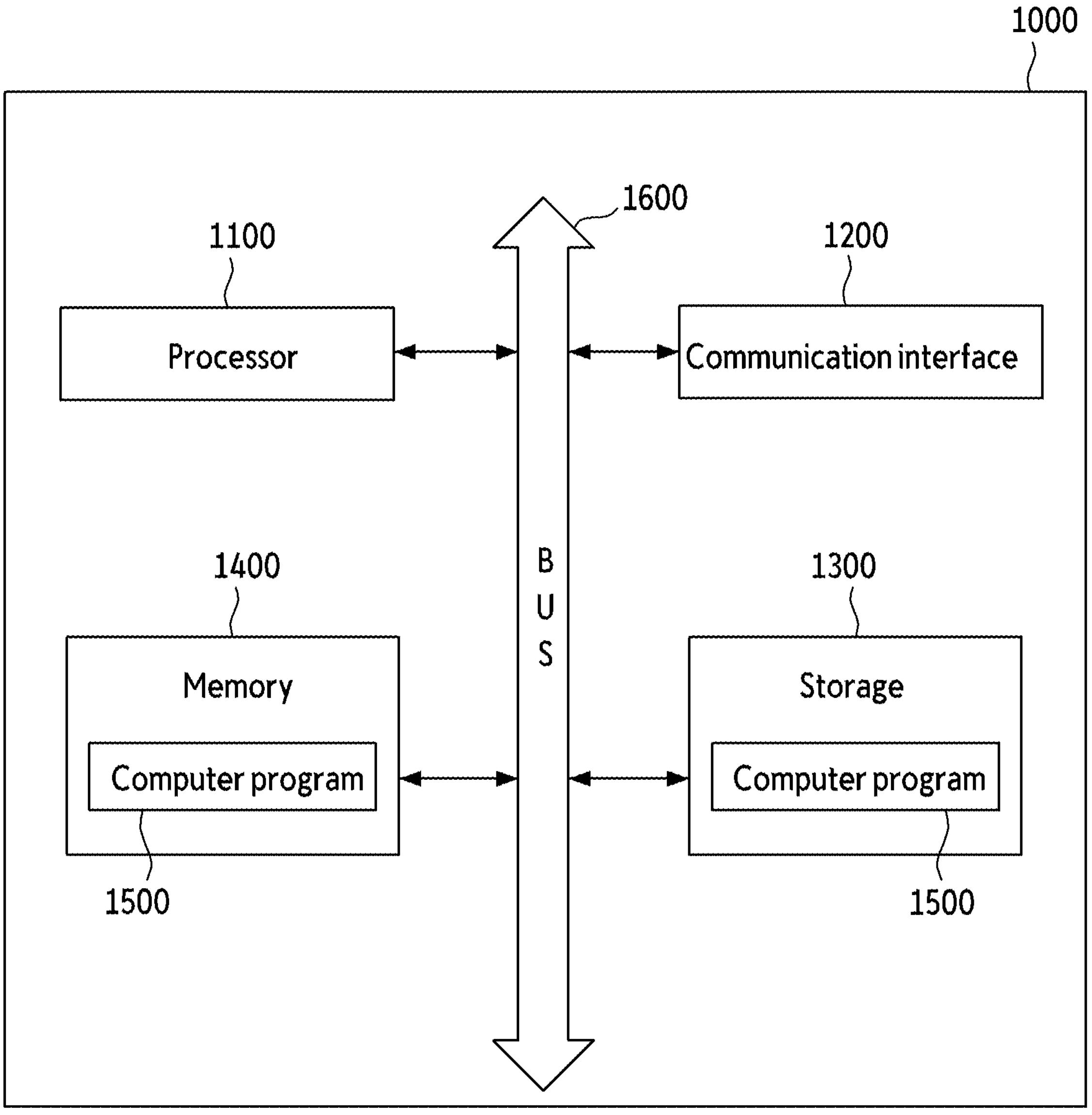
FIG. 8 is an example hardware configuration diagram capable of implementing a computing device in accordance with various embodiments.

FIG. 8 is an exemplary hardware configuration diagram illustrating how a computing device can be implemented in various embodiments. The computing device of FIG. 8 may be associated with the aforementioned communication device 110, 120 or key generation server 130.

The computing device 1000 may include at least one processor 1100, a bus 1600, a communication interface 1200, a memory 1400, which loads a computer program 1500 to be executed by the processor 1100, and a storage 1300, which stores the computer program 1500. Only components related to the embodiment are illustrated in FIG. 8. Accordingly, a person skilled in the art to which the embodiments of the present disclosure may recognize that other general components may be included in addition to the components illustrated in FIG. 7.

The processor 1100 may control the overall operation of each of the components of the computing device 1000. The processor 1100 may be configured to include at least one of a central processing unit (CPU), a micro-processor unit (MPU), a micro-controller unit (MCU), a graphics processing unit (GPU), or any form of processor well-known in the field of the present disclosure. Additionally, the processor 1100 may perform computations for at least one application or program to execute operations/methods according to some embodiments of the present disclosure. The computing device 1000 may be equipped with one or more processors.

The memory 1400 may store various data, commands, and/or information. The memory 1400 may load the computer program 1500 from the storage 1300 to execute the operations/methods according to some embodiments of the present disclosure. The memory 1400 may be implemented as a volatile memory such as a random-access memory (RAM), but the present disclosure is not limited thereto.

The bus 1600 may provide communication functionality between the components of the computing device 1000. The bus 1600 may be implemented in various forms such as an address bus, a data bus, and a control bus. The communication interface 1200 may be connected to a communication network. The storage 1300 may non-transitorily store at least one computer program 1500. The storage 1300 may be configured to include a non-volatile memory such as a flash memory, as well as a computer-readable recording medium in any form well-known in the technical field of the present disclosure, such as a hard disk or a removable disk.

The computer program 1500 may include one or more instructions that enable the processor 1100 to perform the operations/methods according to various embodiments of the present disclosure when loaded into the memory 1400. In other words, by executing the loaded instructions, the processor 1100 may perform the operations/methods according to various embodiments of the present disclosure. The computer program 1500 may include instructions for methods according to various embodiments described with reference to FIGS. 1 to 7.

According to one embodiment, the computer program 1500 may include instructions for acquiring a first public key using an identifier of a second user, encrypting first data using the first public key, transmitting a second public key and the encrypted first data to a communication device related to the second user, receiving encrypted second data and encrypted third data from the communication device, decrypting the encrypted second data using a first secret key generated based on an identifier of a first user, decrypting the third data using a second secret key related to the second public key and generating a session key for communication with the communication device, using the decrypted first data, the decrypted second data, and the decrypted third data.

So far, a variety of embodiments of the present disclosure and the effects according to embodiments thereof have been mentioned with reference to FIGS. 1 to 8. The effects according to the technical idea of the present disclosure are not limited to the forementioned effects, and other unmentioned effects may be clearly understood by those skilled in the art from the description of the specification.

The methods according to the embodiments of the present disclosure described above may be performed by executing a computer program implemented using a computer-readable code. The computer program may be transmitted from a first computing device to a second computing device via a network such as the Internet and installed on the second computing device, and may be used by the second computing device. Furthermore, although the operations are illustrated in a specific order in the drawings, it should not be understood that the operations should be executed in the specific order as illustrated or in a sequential order or that all illustrated operations should be executed to acquire a desired result. In certain situations, multitasking and parallel processing may be advantageous.

Although some embodiments of the present disclosure have been described above with reference to the accompanying drawings, the present disclosure may not be limited to some embodiments and may be implemented in various different forms. Those of ordinary skill in the technical field to which the present disclosure belongs will be able to appreciate that the present disclosure may be implemented in other specific forms without changing the technical idea or essential features of the present disclosure. Therefore, it should be understood that some embodiments as described above are not restrictive but illustrative in all respects.

What is claimed is:

1. A method for exchanging a key, the method being performed by a first communication device related to a first user, the method comprising:

acquiring a first public key using an identifier of a second user;

encrypting first data using the first public key;

transmitting a second public key and the encrypted first data to a second communication device related to the second user;

receiving encrypted second data and encrypted third data from the second communication device;

decrypting the encrypted second data using a first secret key generated based on an identifier of the first user;

decrypting the third data using a second secret key related to the second public key; and generating a session key for communication with the second communication device, using the decrypted first data, second and third data.

2. The method of claim 1, further comprising:

after generating the session key, encrypting data to be transmitted to the second communication device using the generated session key; and transmitting the encrypted data to the second communication device.

3. The method of claim 1, further comprising:

before transmitting the second public key and the encrypted first data to the second communication device related to the second user, generating the second public key and a second private key using a key generation algorithm.

4. The method of claim 1, wherein the encrypted second data is data encrypted using a third public key generated based on the identifier of the first user, wherein the encrypted third data is data encrypted using the second public key.

5. The method of claim 1, wherein the acquiring of the first public key using the identifier of the second user includes:

generating a plurality of bit strings based on the identifier of the second user;

acquiring a plurality of public key parameters related to the generated plurality of bit strings; and acquiring the first public key based on the acquired plurality of public key parameters.

6. The method of claim 5, wherein the acquiring of the plurality of public key parameters includes extracting a public key parameter corresponding to each of the plurality of bit strings from a table in which a public key parameter related to each index is recorded.

7. The method of claim 6, wherein the table in which the public key parameter related to each index is recorded is received from an external device.

8. The method of claim 5, wherein the acquiring of the first public key includes:

applying the plurality of public key parameters to a predetermined mathematical formula or algorithm to calculate an operation result value on the plurality of public key parameters; and determining the calculated operation result value as the first public key.

9. A method for acquiring a key, the method being performed by a second communication device related to a second user, the method comprising:

receiving a second public key and encrypted first data from a first communication device related to a first user;

decrypting the encrypted first data using a first secret key generated based on an identifier of the second user;

acquiring a first public key based on an identifier of the first user;

encrypting second data using the first public key;

encrypting third data using the second public key;

transmitting the encrypted second data and the encrypted third data to the first communication device such that the first communication device generates a session key; and generating the session key using the decrypted first data, the decrypted second data, and the decrypted third data.

10. The method of claim 9, wherein the encrypted first data is data encrypted using a third public key generated based on the identifier of the second user.

11. The method of claim 9, wherein the acquiring of the first public key based on the identifier of the first user includes:

generating a plurality of bit strings based on the identifier of the first user;

acquiring a plurality of public key parameters related to the generated plurality of bit strings; and acquiring the first public key, based on the acquired plurality of public key parameters.

12. The method of claim 11, wherein the acquiring of the plurality of public key parameters includes extracting a public key parameter corresponding to each of the plurality of bit strings from a table in which a public key parameter related to each index is recorded.

13. The method of claim 11, wherein the acquiring of the first public key includes:

applying the plurality of public key parameters to a predetermined mathematical formula or algorithm to calculate an operation result value on the plurality of public key parameters; and determining the calculated operation result value as the first public key.

14. A computing device comprising:

one or more processors; and a memory for storing therein a computer program executed by the one or more processors, wherein the computer program includes instructions for:

acquiring a first public key using an identifier of a second user;

encrypting first data using the first public key;

transmitting a second public key and the encrypted first data to a communication device related to the second user;

receiving encrypted second data and encrypted third data from the communication device;

decrypting the encrypted second data using a first secret key generated based on an identifier of a first user;

decrypting the third data using a second secret key related to the second public key; and generating a session key for communication with the communication device, using the decrypted first data, the decrypted second data, and the decrypted third data.

15. The computing device of claim 14, wherein the computer program further includes an instruction for generating the second public key and a second private key using a key generation algorithm, prior to the transmitting of the second public key and the encrypted first data to the communication device related to the second user.

16. The computing device of claim 14, wherein the encrypted second data is data encrypted using a third secret key generated based on the identifier of the first user, wherein the encrypted third data is data encrypted using the second public key.

17. The computing device of claim 14, wherein the acquiring of the first public key using the identifier of the second user includes:

generating a plurality of bit strings based on the identifier of the second user;

acquiring a plurality of public key parameters related to the generated plurality of bit strings; and acquiring the first public key based on the acquired plurality of public key parameters.

18. The computing device of claim 17, wherein the acquiring of the plurality of public key parameters includes extracting a public key parameter corresponding to each of the plurality of bit strings from a table in which a public key parameter related to each index is recorded.

19. The computing device of claim 18, wherein the table in which the public key parameter related to each index is recorded is received from an external device.

20. The computing device of claim 17, wherein the acquiring of the first public key includes:

applying the plurality of public key parameters to a predetermined mathematical formula or algorithm to calculate an operation result value on the plurality of public key parameters; and determining the calculated operation result value as the first public key.

* * * * *